United States Patent [19]
Okano

[11] Patent Number: 5,041,909
[45] Date of Patent: Aug. 20, 1991

[54] MULTI-CHANNEL VIDEO SIGNAL TRANSMISSION/REPRODUCTION SYSTEM

[75] Inventor: Takashi Okano, Tokorozawa, Japan

[73] Assignee: Pioneer Electronic Corporation, Tokyo, Japan

[21] Appl. No.: 568,640

[22] Filed: Aug. 16, 1990

Related U.S. Application Data

[63] Continuation of Ser. No. 232,759, Aug. 16, 1988, abandoned.

[30] Foreign Application Priority Data

Dec. 9, 1987 [JP] Japan .................. 62-312667
Dec. 9, 1987 [JP] Japan .................. 62-312668
Dec. 9, 1987 [JP] Japan .................. 62-312669

[51] Int. Cl.$^5$ ............................................. H04N 5/04
[52] U.S. Cl. .................................. 358/146; 358/142
[58] Field of Search .................. 358/141–147, 358/133, 136

[56] References Cited

U.S. PATENT DOCUMENTS 3,715,483  2/1973  Limb et al. .................. 358/133
3,991,266  11/1976  Baer .......................... 358/146
4,027,333  5/1977  Kaiser ........................ 358/146

FOREIGN PATENT DOCUMENTS 0052982  5/1981  Japan ......................... 358/143

Primary Examiner—James J. Groody
Assistant Examiner—David E. Harvey
Attorney, Agent, or Firm—Foley & Lardner

[57] ABSTRACT

A plurality of original video signals of channels are processed with a frame unit at intervals of a predetermined cycle in time sequence through the use of time-division multiplexing operation so as to produce a single time-division multiplexed video signal, two interlaced fields constituting one frame of the multiplexed video signal are composed of two fields of the original video signal spaced in time sequence apart from each other at intervals of a predetermined number of fields in the original video signal. In reproduction, in response to the motion of the picture, the field repetition reproducing operation and the frame repetition reproducing operation are selectively conducted so as to improve the vertical picture resolution even when the original video signal represents a picture containing a motion.

9 Claims, 11 Drawing Sheets

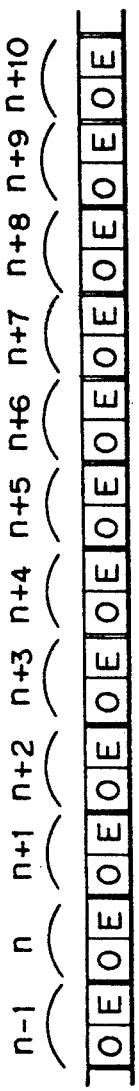
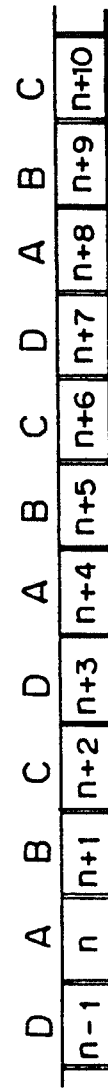
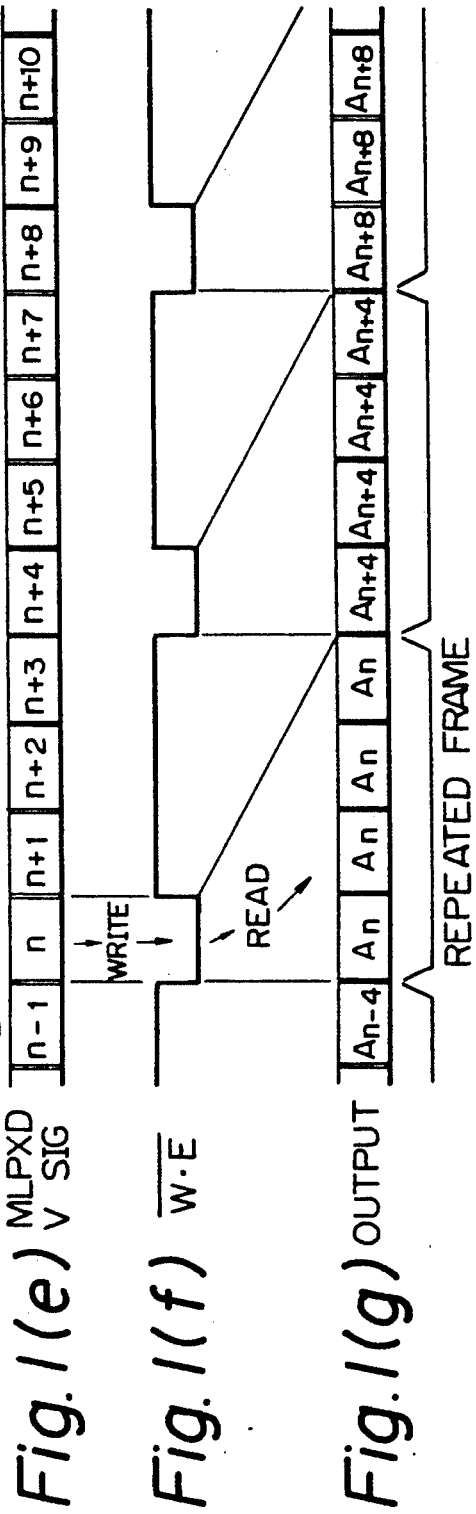

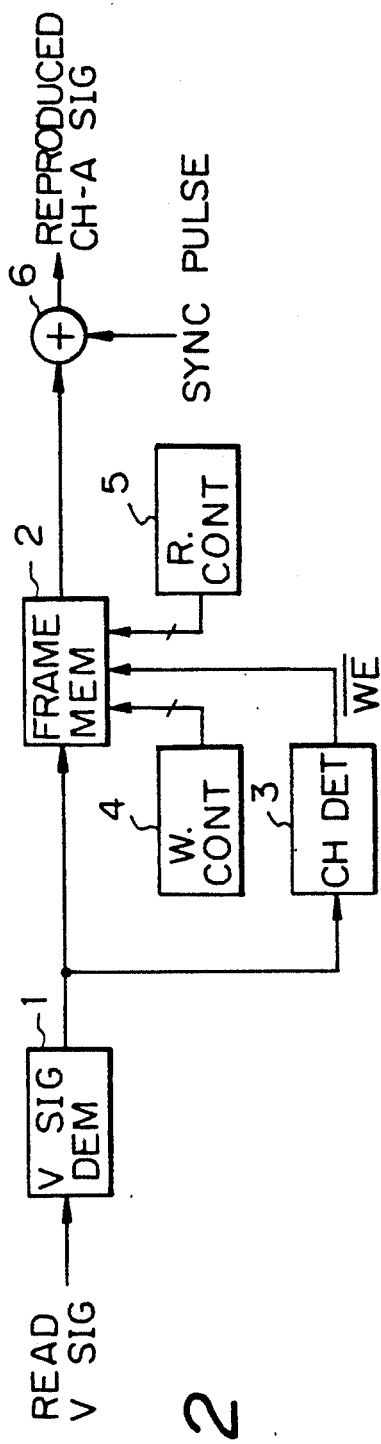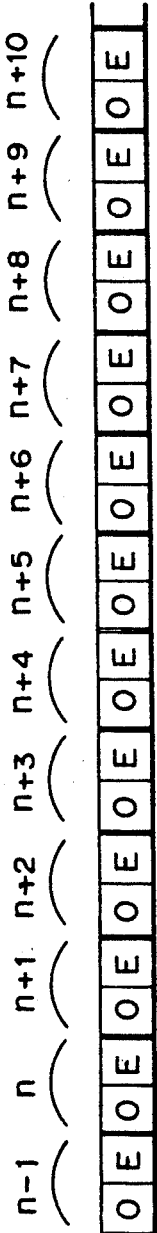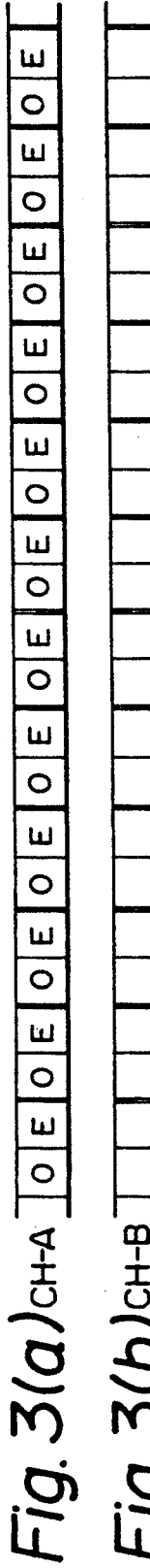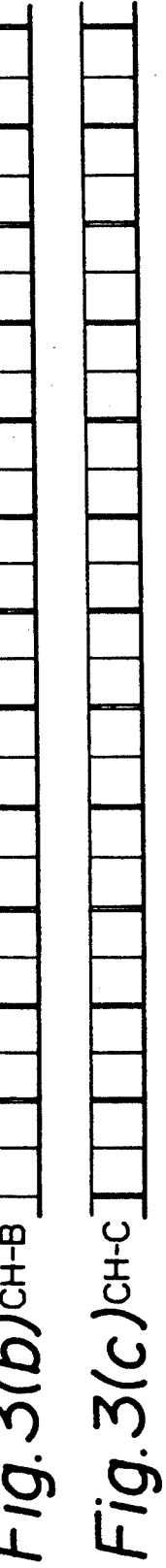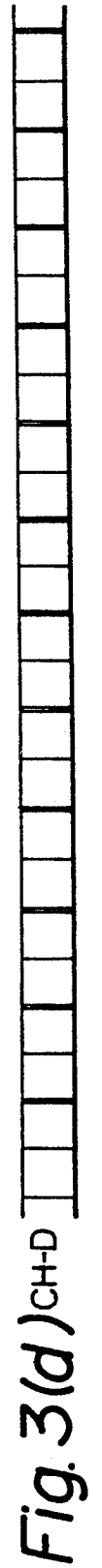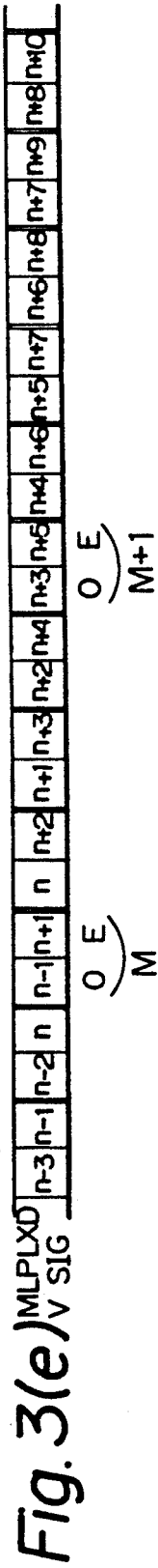
Fig. 2
Fig. 3(a) CH-A
Fig. 3(b) CH-B
Fig. 3(c) CH-C
Fig. 3(d) CH-D
Fig. 3(e) MLPLXD V SIG

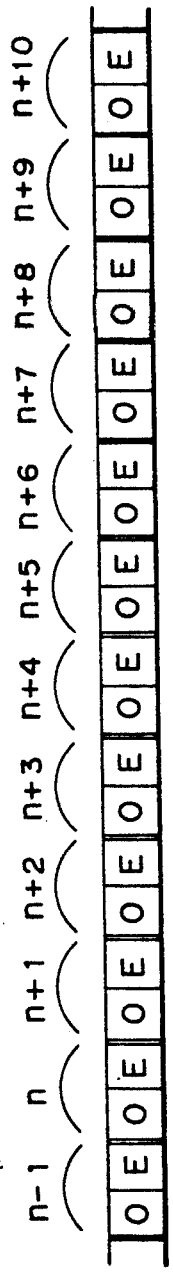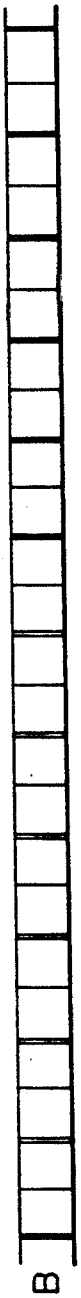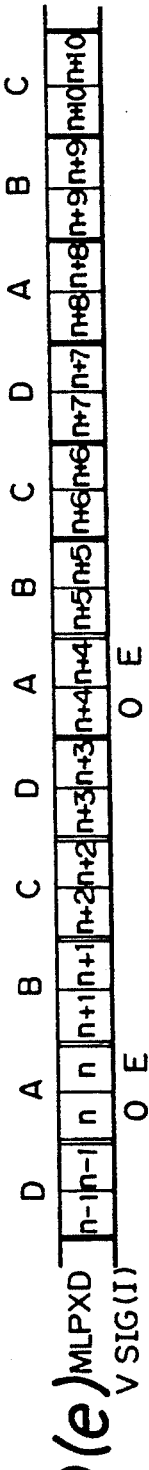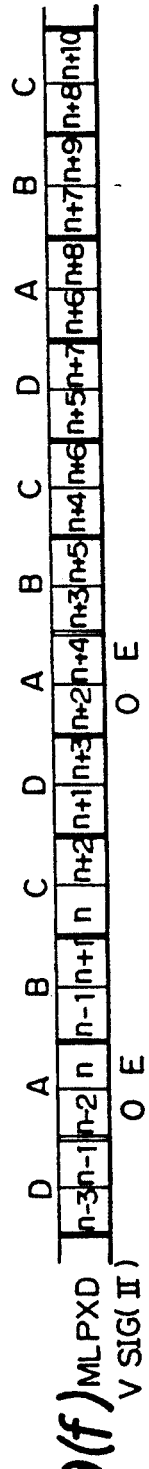
Fig.9(a) CH-A
Fig.9(b) CH-B
Fig.9(c) CH-C
Fig.9(d) CH-D
Fig.9(e) MLPXD V SIG(I)
Fig.9(f) MLPXD V SIG(II)

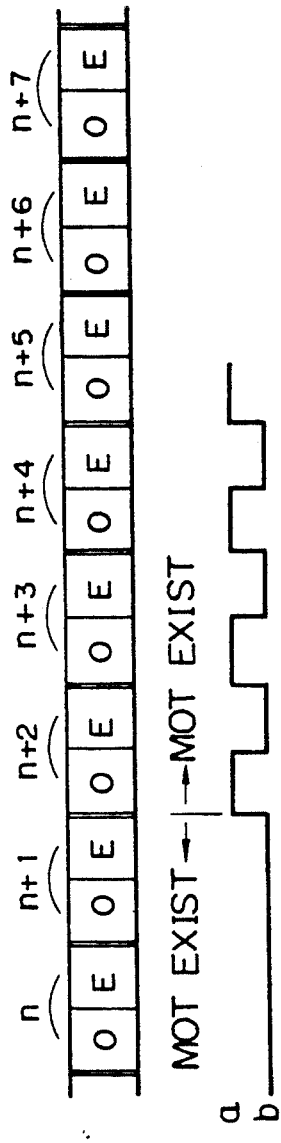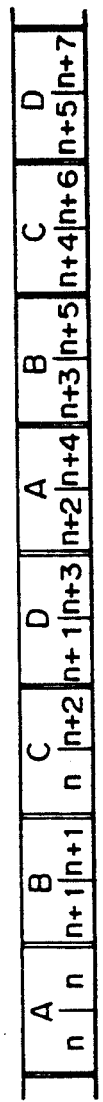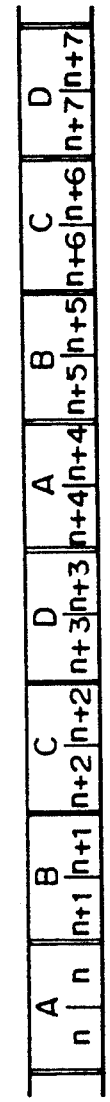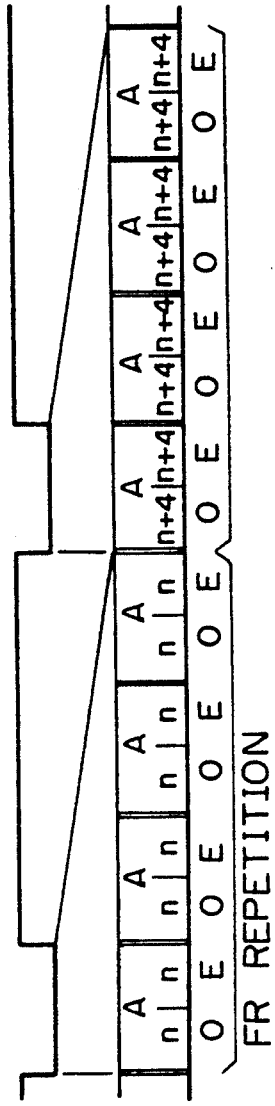

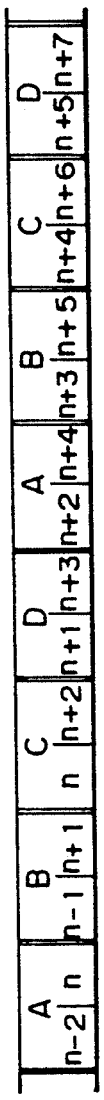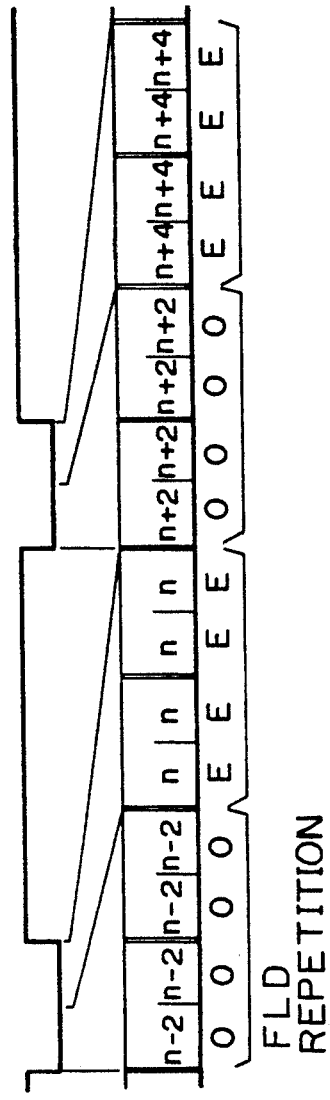
Fig.13(a) CH-A SIG
Fig.13(b) W·E
Fig.13(c) OUT
Fig.14

MULTI-CHANNEL VIDEO SIGNAL TRANSMISSION/REPRODUCTION SYSTEM

This application is a continuation of application Ser. No. 07/232,759, filed Aug. 16, 1989, now abandoned.

BACKGROUND OF THE INVENTION

1. Field of the Invention:

The present invention relates to a video signal transmission and/or reproduction system for a plurality of channels and, more particularly, to a transmission system in which a plurality of original video signals of a plurality of channels are processed in a frame unit at intervals of a predetermined cycle in time sequence through the use of time-division multiplexing operation so as to be converted into a single time-division multiplexed video signal; and to a reproduction system in which a video signal corresponding to one of the plurality of the channels is reproduced on the basis of such time-division multiplexed video signal.

2. Description of the Related Art:

A conventional transmission system is known in which a plurality of, for example four (4), original video signals of channels A, B, C and D shown in FIG. 1(a) through FIG. 1(d) respectively are processed through the use of time-division multiplexing operation to prepare a signal time-division multiplexing video signal of FIG. 1(e) which may be recorded on a suitable recording medium from which a desired one or more of the video signals are reproduced. As seen from in FIGS. 1(a) through 1(e), one frame (referred to as channel frame hereinbelow) of each of the original video signals of the channels A, B, C and D is picked up every four frames of each original video signal, and processed in time sequence through the use of time-division multiplexing operation so as to prepare a signal time-division multiplexed video signal of FIG. 1(e). The thus prepared time-division multiplexed video signal is recorded on a suitable recording medium such as video tapes, video discs and the like.

FIG. 2 shows a conventional reproduction apparatus for reproducing a video signal of a desired channel. For example, the channel A is reproduced from the time-division multiplexed video signal of FIG. 1(e) recorded on the recording medium. As shown in FIG. 2, the multiplexed signal from the recording medium enters a video signal from the recording medium enters a video signal demodulation circuit 1 so as to be demodulated therein, and then enters a one-frame memory 2 and a channel detection circuit 3. In this circuit 3, the channel frames corresponding to the channel A contained in the multiplexed signal are picked by a low-level signal during a period of one frame every four frames, the low-level signal being fed to the memory 2 as a write-enabling signal $\overline{WE}$ of FIG. 1(f). As a result, only the channel frames of channel A stored in the memory 2 under control by a memory write control circuit 4. The frame memory 2 is then controlled by a memory read control circuit 5 so as to repeatedly issue the channel frames to an adder 6 in which synchronizing pulses are applied to the channel frames thereby to prepare the reproduced video single of FIG. 1(g) which is reproduced with the four frame cycle.

Referring to FIGS. 1(a) through 1(g), there has been shown a frame-editing method for preparing the multiplexed video signal in which the original video signals, of the four channels A, B, C and D are multiplexed in terms of the four frame cycle. However, a field-editing method is also known for preparing a time-division multiplexed video signal.

As described above, in the frame-editing method, an editing cycle of the multiplexed video signal is equal to a period of 4 frames (8 fields). When motion appears in a picture, motion is produced even between two interlaced fields belonging to the same frame. As a result, when the picture includes a motion, the frame containing such picture difference in motion is repeated four times in the reproduced picture to cause vibrative motions. Such vibrative motions seriously impair the reproduced picture quality.

On the other hand, in the field-editing method, an editing cycle of the mulitplexed video signal is equal to a period of 4 fields (2 frames) which is a half period of the editing cycle of the frame-editing method. In addition, in the field-editing method, an identical field is repeated so that there is no fear that the above-mentioned vibrative motions of the picture are produced in the reproduced picture. This is an advantage inherent in the field-editing method, but the field editing method is inferior in vertical resolution of the picture to the frame-editing method.

SUMMARY OF THE INVENTION

It is an object of the present invention to provide a video signal transmission/reproduction system for a plurality of channels, which can reproduce the channel signal which is excellent in vertical resolution and free from a vibrating motion of the picture even if the original channel signal contains some motions.

According to the present invention, a video signal transmission system for the plurality of channels is provided. The video signals of a plurality of channels are processed with a frame unit at intervals through the use of time-division multiplexing operation so as to be converted into a single time-division multiplexed video signal. The improvement resides in that: two interlaced fields constituting one frame of the time division multiplexed video signal are composed of two fields spaced in time apart from each other at intervals of a predetermined number of fields in each channel.

According to the present invention, another video signal transmission system for the plurality of channels is provided. The video signals of a plurality of channels are processed with a frame unit at intervals through the use of time-division multiplexing operation so as to be converted into a signal time-division multiplexed video signal. The improvement resides in that: two interlaced fields constituting one frame of the time-division multiplexed video signal have two field-combination blocks in one frame the two interlaced fields are composed of parts of two fields belonging to the same frame in the original video signal of each of the channels, and in the other frame the two interlaced fields are composed of parts of two fields spaced in time sequence apart from each other at intervals of a predetermined number of fields in the original video signal of each of the channels. A flag signal representing motion of the frame picture in each of the picture blocks is added to each of the frames of the time-division multiplexed video signal.

A reproduction system according to the present invention for reproducing the time-division multiplexed video signal, is characterized as follows: It first picks up samples of one of the channels input into a picture memory. When samples are continuously issued from the picture memory, the motion of the frame picture is detected through a motion detecting means, or determined on the basis of the flag signal added to each of the frames of the time-division multiplexed video signal, and, in a motion part of the frame picture, the same field is repeated a predetermined times, while in a substantially non-motion part of the frame picture the same frame is repeated a predetermined times.

BRIEF DESCRIPTION OF THE DRAWINGS

FIGS. 1(a) through 1(g) are diagrams illustrating a construction of original video signals of four channels and a conventional time-division multiplexed video signal led from the original video signals, which appear in the conventional multi-channel video signal transmission and reproduction system;

FIG. 2 is a block diagram of a conventional multi-channel video signal reproducing apparatus for reproducing a video signal of, for example, a channel A;

FIG. 3 is a diagram illustrating a construction of a time-division multiplexed video signal composed of original video signals of four channels, which appears in a video signal transmission and reproduction system according to the present invention;

FIG. 9 is a diagram illustrating a construction of each video signal such as the time-division multiplexed video signal composed of original video signals of four channels, employed in another video signal transmission and reproduction system according to the present invention;

FIG. 11 is a diagram illustrating operation wave forms of the editing apparatus shown in FIG. 10;

FIG. 12 is a diagram for illustrating a construction of each video signal issued from a memory in a memory read mode at a time when the motion of the frame picture is substantially not observed, according to the present invention;

FIG. 13 is a diagram for illustrating a construction of each video signal issued from the memory in the memory read mode at a time when the motion of the frame picture is observed, according to the present invention;

FIG. 14 is a diagram illustrating an example of a time-division multiplexed video signal in which each field is divided into at least two blocks, according to the present invention.

DESCRIPTION OF THE PREFERRED EMBODIMENTS

In FIGS. 3(a) through 3(e), a process according to the present invention is shown which multiplexes in a time-division manner original video signals of four channels A, B, C and D to prepare a single time-division multiplexed video signal. Each frame is composed of two interlaced fields which are not adjacent to each other, but spaced apart from each other at intervals of a predetermined length in time sequence. In these figures, the character "n" represents the frame number and characters "O" and "E" mean the odd and even fields, respectively.

Figure 4A:
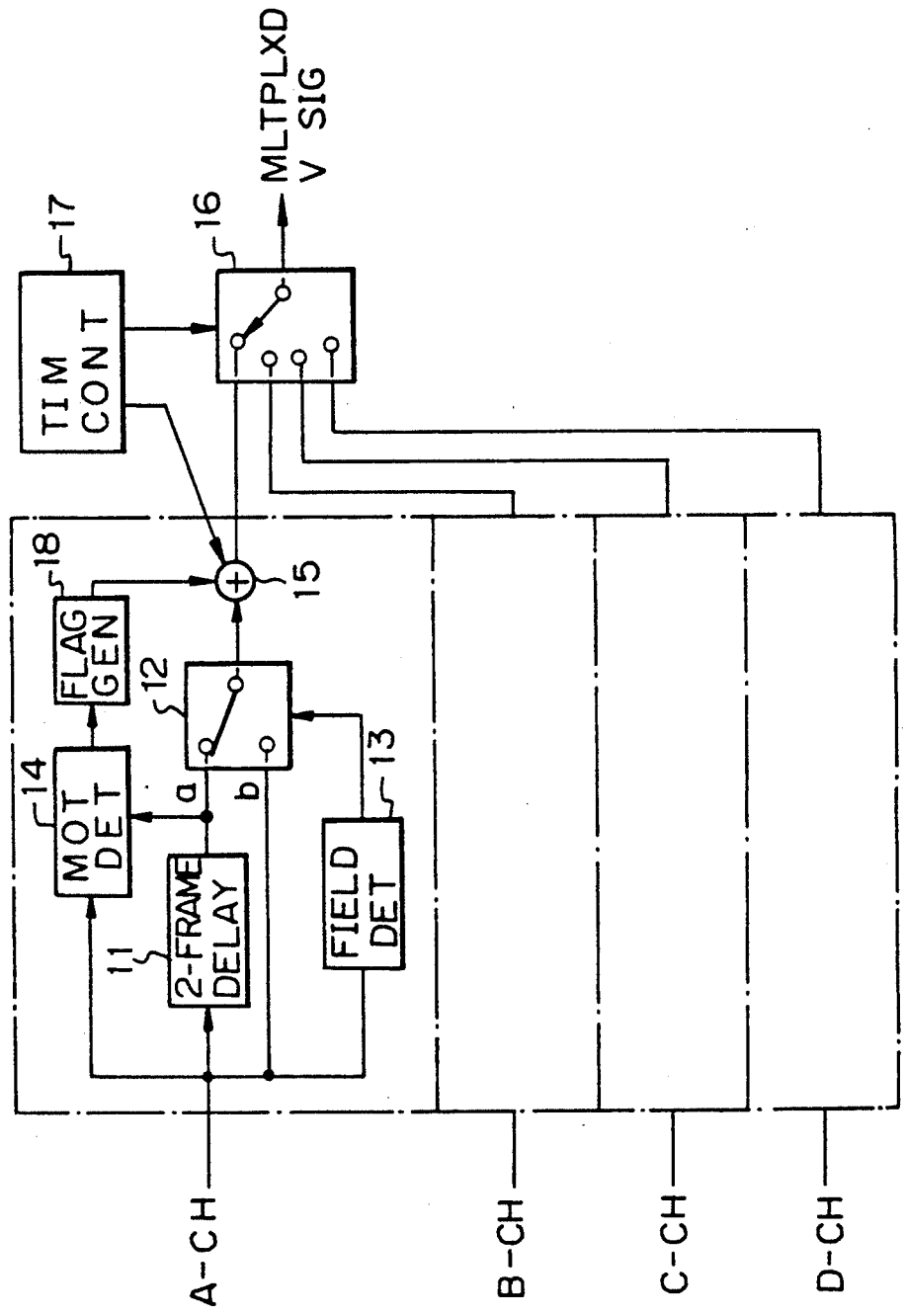
FIG. 4A is a block diagram of an embodiment of an editing apparatus for preparing a single time-division multiplexed signal on the basis of the original video signals of four channels according to the present invention.

FIG. 4 shows an embodiment of an editing apparatus according to the present invention for preparing the time-division multiplexed video signal of FIG. 3(e) on the basis of the original video signals of the four channels A, B, C and D. Incidentally, in the embodiment of the present invention shown in FIG. 4, though only a concrete circuit for the channel A is illustrated, the same circuit as that of the channel A is also provided for each of the remaining channels B, C and D.

As shown in FIG. 4, a video signal of each channel is directly received by each of a switch 12 at its input terminal "b", a field-judge circuit 13 and a motion detector circuit 14, while also received by a 2-frame delay circuit 11 to delay by a period of two frames so as to form a 2-frame delayed video signal entering another input terminal "a" of the switch 12. On the basis of an output signal issued from the field-judge circuit 13, the switch 13 connects: its input terminal "a" with an adder 15 to select the 2-frame delay video signal when the output signal issued from the field-judge circuit 13 represents an odd field; and its another input terminal "b" with the adder 15 to select a current video signal when the output signal issued from the field-judge circuit 13 represents an even field, whereby two interlaced fields constituting one frame of the time-division multiplexed video signal of FIG. 3(e) are composed of the even field of the frame of the current video signal and the odd field of the frame of the 2-frame delayed video signal.

The motion detector circuit 14 detects a motion of a frame picture by detecting a picture difference produced between the frame pictures of the current video signal and the 2-frame delayed video signal. Since the motion detector circuit 14 is well known in the art, the detail thereof is neglected. The motion detector circuit 14 issues its output signal serving as a flag signal representing an amount of the motion of the picture produced between the two interlaced fields of each frame of the multiplexed video signal. The flag signal issued from the motion detector circuit 14 enters the added 15 in which the flag signal or code signal is inserted into a vertical blanking period of each frame of the mulitplexed video signal. The thus prepared video signal of each channels enters a video switcher 16 through which one frame of the video signal of each channel is issued every four frames thereof so that the signal time-division multiplexed video signal shown in FIG. 3(e) is prepared. Incidentally, operations of the adder 15 and the video switcher 16 are controlled by a timing control circuit 17.

It is now to be understood that one frame of the resultant time-division multiplexed video signal appearing at a time position assigned to one channel consists of odd and even fields which, respectively, originally belonged to two different frames of the same original channel signal, these two different frames being apart from each other by a number of frames smaller than the number of those channels to be multiplexed.

Figures 4B, 7:
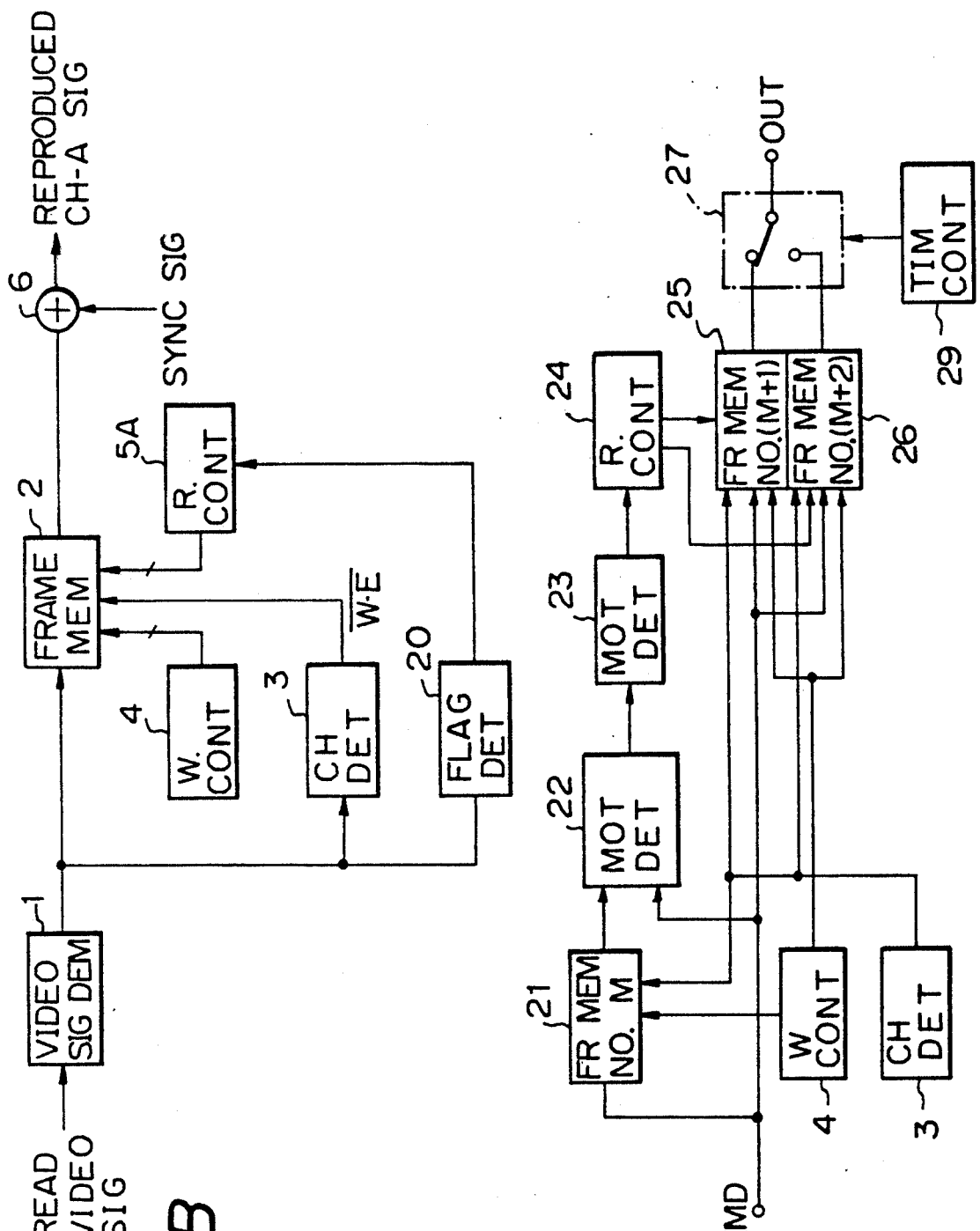
FIG. 4B is a block diagram showing a reproducing apparatus for reproducing a time-division multiplexed signal edited by the editing apparatus of FIG. 4A according to the present invention.
FIG. 7 is a block diagram of an embodiment of a memory read control section of motion adaptive type based on a frame difference detection, according to the present invention.

The video signal of a desired channel must be reproduced from the thus prepared multiplexed video signal. Such a reproducing apparatus is shown in FIG. 4B. In this apparatus, the video signal of the desired channel, for example, channel A is sequentially stored in a frame memory 2 and repeatedly issued so as to compensate a signal-missing period of the video signal in the cyclic period of four frames.

The flag detector 20 determines the existence of any motion of a picture of a channel frame on the basis of the flag signal or code signal which is inserted into the vertical blanking period of each frame. When the flag detector 20 determines that the picture of the frame contains less motion, then the read-out control 5A performs the frame repetition read-out mode. When the flag detector 2 determines that the picture of the frame contains more motion, then the read-out control 5A performs the field repetition read-out mode.

Figure 4C:
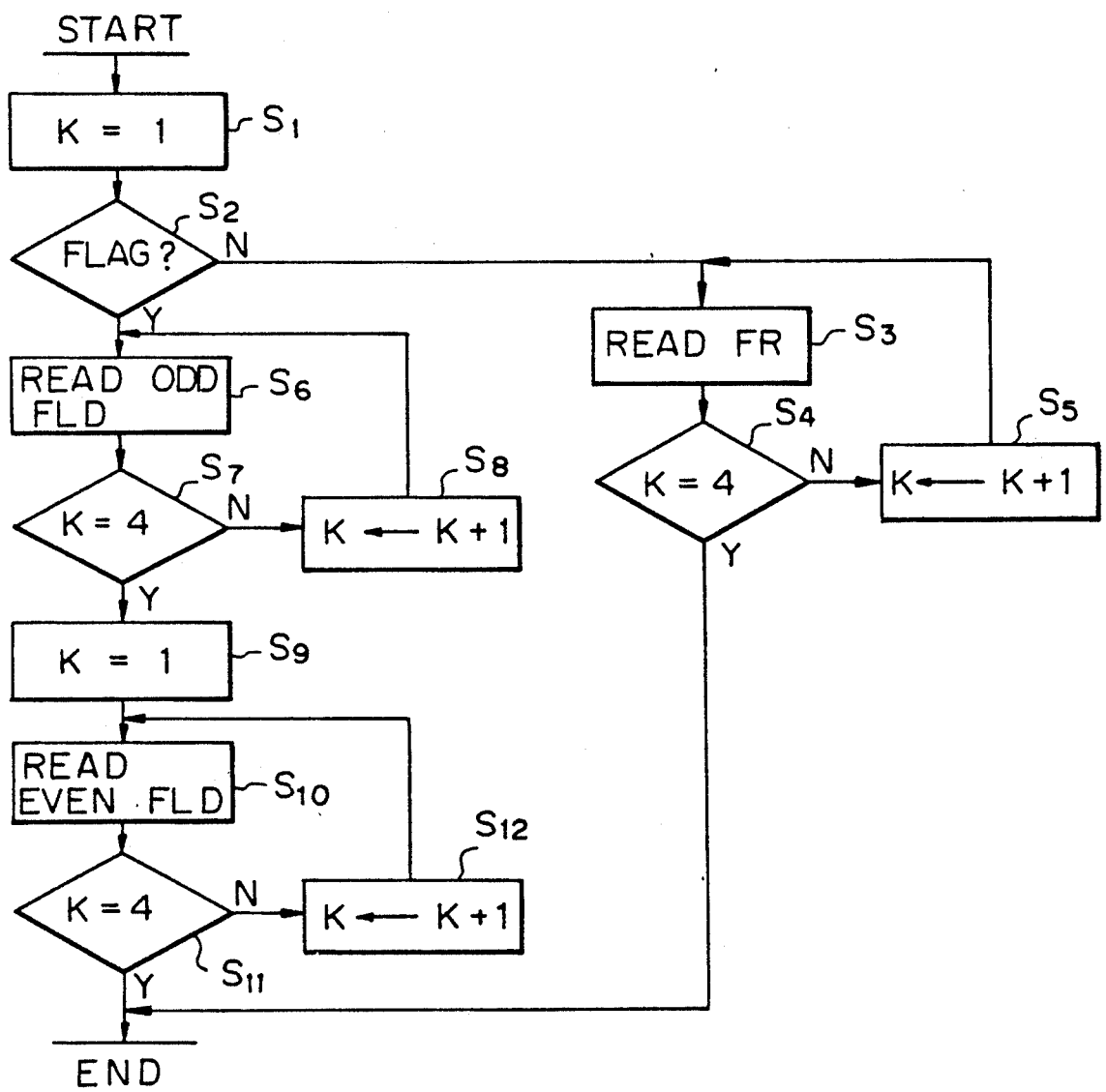
FIG. 4C is a flow chart showing a read-out operation mode of the reproducing apparatus of FIG. 4B.

FIG. 4C shows operational modes of the read-out control circuit 5 for performing the above-mentioned reproducing operation.

When the read-out control circuit 5 detects the completion of the write-in operation of the write-in control circuit 4, then the read-out control circuit 5 performs the read-out routine of FIG. 4C. In this routine, a coefficient K is first set to "1" at a step $S_1$. Then, it is determined from the current channel frame whether the flag detector 20 has detected the motion flag or not at a step $S_2$. When it is determined that the flag detector 20 has not detected the motion flag from the current channel frame then the read-out control circuit 5 repeatedly reads out the frame signal memorized in the frame memory 2 until the coefficient K becomes "4" at steps $S_3$, $S_4$ and $S_5$. When, on the other hand, it is determined that the flag detector 20 has detected the motion flag at the step $S_2$, then the odd field of the current frame is read out at four times at the steps $S_6$, $S_7$ and $S_8$. Then the coefficient K is again set to "1" at a step $S_9$ and then the even field of the current frame is read out at four times at steps $S_{10}$, $S_{11}$ and $S_{12}$.

Figure 5:
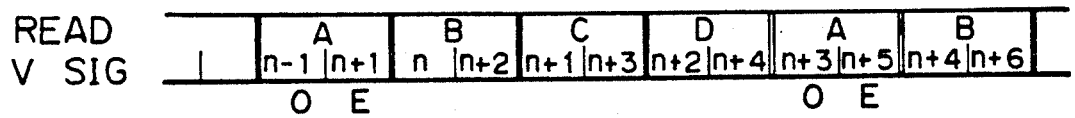
FIG. 5 is a digram illustrating a construction of each video signal issued from a memory in a memory read mode at a time when the motion of the frame picture is substantially not observed, according to the present invention.

FIG. 5 is a diagram illustrating a construction of each video signal issued from a memory in a memory read mode at a time when the motion of the picture is substantially not observed. When a motion of the picture of the original video signal of channel A is substantially not observed, there is substantially no difference in motion of the picture between fields of the video signal. Consequently, there is no fear that a picture of a video signal having a frame composed of an odd-numbered field and an even-numbered field is vibrated when reproduced. In addition, since the frame is composed of the odd-numbered field and the even-numbered field in the video signal, it is possible to prevent the picture from deteriorating in its vertical resolution in comparison to a field reproducing system in which the frame is composed of the odd-numbered and the even-numbered fields both belonging to the same frame. Consequently, it is possible to obtain a reproduced video signal (memory output signal) excellent in vertical picture resolution by repeating a frame stored in the memory four times.

Figure 6:
FIG. 6 is a diagram illustrating a construction of each video signal issued from the memory in the memory read mode at a time when the motion of the frame picture is observed according to the present invention.

On the other hand, in case that some motion is contained in the picture, a picture difference in motion is produced between the two interlaced fields of the frame. Consequently, in this case, even when the motion of the picture is a one-way motion, there is a problem that the picture vibrates when such frame is repeated four times. In order to solve the above problem, in case that some motion is contained in the picture, as shown in FIG. 6, the odd field of the frame stored in the memory is first repeatedly read out four times, and thereafter the even field of the same frame is repeated read out four times. Since a frame of the time-division multiplexed video signal is composed of two fields of the original video signal the two fields being spaced apart in time sequence from each other at intervals of a period of two frames thereof, a frame-missing period between these two frames has compensated vibrating motion, which is an advantage inherent to the field reproducing mode. It can be seen in this case that the picture is reproduced with a smooth motion since the reproduction of the picture is conducted with half the cycle of that of the conventional reproduction of the picture conducted with the four-frame cycle.

Incidentally, in the above embodiment of the present invention, the picture motion is detected in the recording side so that the flag signal or code signal determining whether the picture is a stable picture or a motion picture is added to the video signal in the recording side. Then, the video signal is transmitted to the reproducing side in which the reproduction of the video signal is conducted through the use of the field repetition mode or the frame repetition mode on the basis of the flag signal or code signal. However, it is also possible to detect the picture motion in the reproducing side so as to select either one of the repetition modes of the video signal.

A reproducing system for reproducing the multiplexed video signal according to the present invention, will be described hereinbelow in which system the picture motion is detected.

For example, it is possible to judge whether the picture of channel A contains any motion or not by detecting a picture difference in motion between the neighboring channel frames of channel A. Consequently, a picture difference in motion is detected between such frames M and M+1 as shown in FIG. 3(e). FIG. 7 shows an embodiment of the memory read control section of motion adaptive type through the use of a frame difference detection.

As shown in FIG. 7, the video signal of frame M+1 of the channel A is sequentially stored in a frame memory 21 in which the video signal of a previous channel frame M has been already stored. When the video signal of the channel frame M+1 is reproduced, the frame memory 21 is operated through the use of a read-modifying write mode. Namely, as the video signal of the frame M is issued from the frame memory 21, the video signal of the frame M+1 enters the same frame memory 21. At the same time, the video signal of the channel frame M+1 enters also an output memory 25. After completion of entrance of the video signal of the channel frame M+1 in the output memory 25, the video signal is controlled by a memory read control circuit 24 so that the motion part of the picture of the video signal is reproduced through the field repetition mode while the stationary part of the picture is reproduced through the frame repetition mode, as described above.

A motion detection of the picture is conducted by detecting a picture difference in motion between the video signals of the channel frame M and the channel frame M+1 by means of a motion detector circuit 22 which is well known in the art, and, therefore its detail is neglected. A detection output signal issued from the motion detector circuit 22 enters the motion memory 23 as one bit signal representing the presence of the motion of the picture in response to the motion of the picture, so that the motion memory 23 issues its output signal to the memory read control circuit 24 to actuate the same. Due to the presence of the detecting operation of the picture motion, the output video signal is delayed by a period of one frame relative to the input video signal. Consequently, it is possible to continuously obtain the output video signal by alternately selecting the output signals issued from the output frame memory 25 and a frame memory 26 by means of a switch 27 at every four frame periods, the frame memory 26 being provided in parallel to the output frame memory 25. It is to be understood that frame memories 21, 25 and 26 are all controlled by write-in control circuit 4 and channel detector 3 as in the apparatus of FIGS. 2 and 3.

Figure 8:
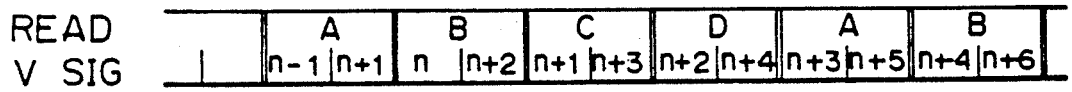
FIG. 8 is a block diagram of an embodiment of a memory read control section of motion adaptive type based on a field difference detection, according to the present invention.

In FIG. 8, there is shown another embodiment of the memory read control section of motion adaptive type, the picture difference in motion is detected between two fields belonging to the same frame. In this embodiment, the odd field of the frame of the input video signal is first received in a memory 31. When the even field is then received in the memory 31, a difference between the video signals of the odd field having been stored in the memory 31 and the current even field is obtained in a digital subtracter 33. The output signal of the digital subtracter 33 is supplied to the memory read control circuit 24 through a vertical spatial low pass filter (LPF) 34. A level detector 35 is provided for detecting that the output level an average exceeds a predetermined level. The subtractor 33, the low pass filter 34 and the level detector 35 cooperate with each other as a motion detector 22A. A motion memory 23 memorizes a motion detection output signal from the detector 22A. After completion of entrance of the video signal of one frame in the memory 31, the video signal is issued from the memory 31 to reproduce the picture having the motion part which is reproduced through the use of the field repetition mode while controlled by the memory read control circuit 24.

In this instance it has been revealed that when the motion detection in conducted on the basis of the picture difference in motion between the fields and the video signal varies in vertical direction of the picture, the output signal issued from the subtractor 33 is in a high level even when the picture contains no motion part, so that a motion is erroneously detected. In order to prevent such erroneous detection, a vertical spatial low pass filter 34 is provided so that possible erroneous operation in detection of the picture motion can be avoided. A frame memory 32 is provided which is controlled in a similar manner as the frame memory 31 in an alternative manner with the frame memory 31.

With respect to a method for detecting the picture motion, there are a large number of well known techniques in the art, so that any of the prior art may be employed in the present invention. The present invention is concerned with the reproduction of the respective original channel signals while compensating the signal-missing period between the time positions assigned to each of the plurality of channels in different manners either of which is to be selected in response to the presence or absence of the picture motion in the original video signal.

With reference to FIG. 9, another embodiment of the video signal transmission system of the present invention will be described hereinbelow. As shown in FIG. 9, the original video signals of a number of, for example, four channels A, B, C and D are processed in a frame-by-frame manner through the use of the time-division multiplexing operation so as to produce a single time-division multiplexed video signal (I) or (II) in response to the motion of the picture. In case that the picture contains substantially no motion, the original video signals are converted into the time-division multiplexed video signal (I) which includes frames respectively corresponding to the channel frames of the original video signals. On the other hand, in case that the pictures contains some motion, the original video signals are converted into the time-division multiplexed video signal (II) in which frames of each of the original video signals are picked up at intervals periods of four fields, and then two fields are combined to prepare one frame of the multiplexed signal (II) in which the two fields are spaced apart from each other at intervals of a period of two frames of the multiplexed video signal. Namely, in the multiplexed video signal (I) or (II), the frames of the video signal of each channel are spaced apart from each other at intervals of a period of four frames of the multiplexed video signal regardless of the presence of the motion of the picture. If the picture contains substantially no motion, each frame of the multiplexed video signal (I) is composed of two fields adjacent in time sequence to each other and belonging to the same frame in the original video signals. On the other hand, if the picture contains some motion, each frame of the multiplexed video signal (II) is composed of two fields spaced in time sequence apart from each other in the original video signals. Namely, the particular two fields belong to two different frames appearing within a region defined by two channel frames sandwiching a channel frame appearing at the time position assigned to the frame corresponding to the particular frame.

Figure 10:
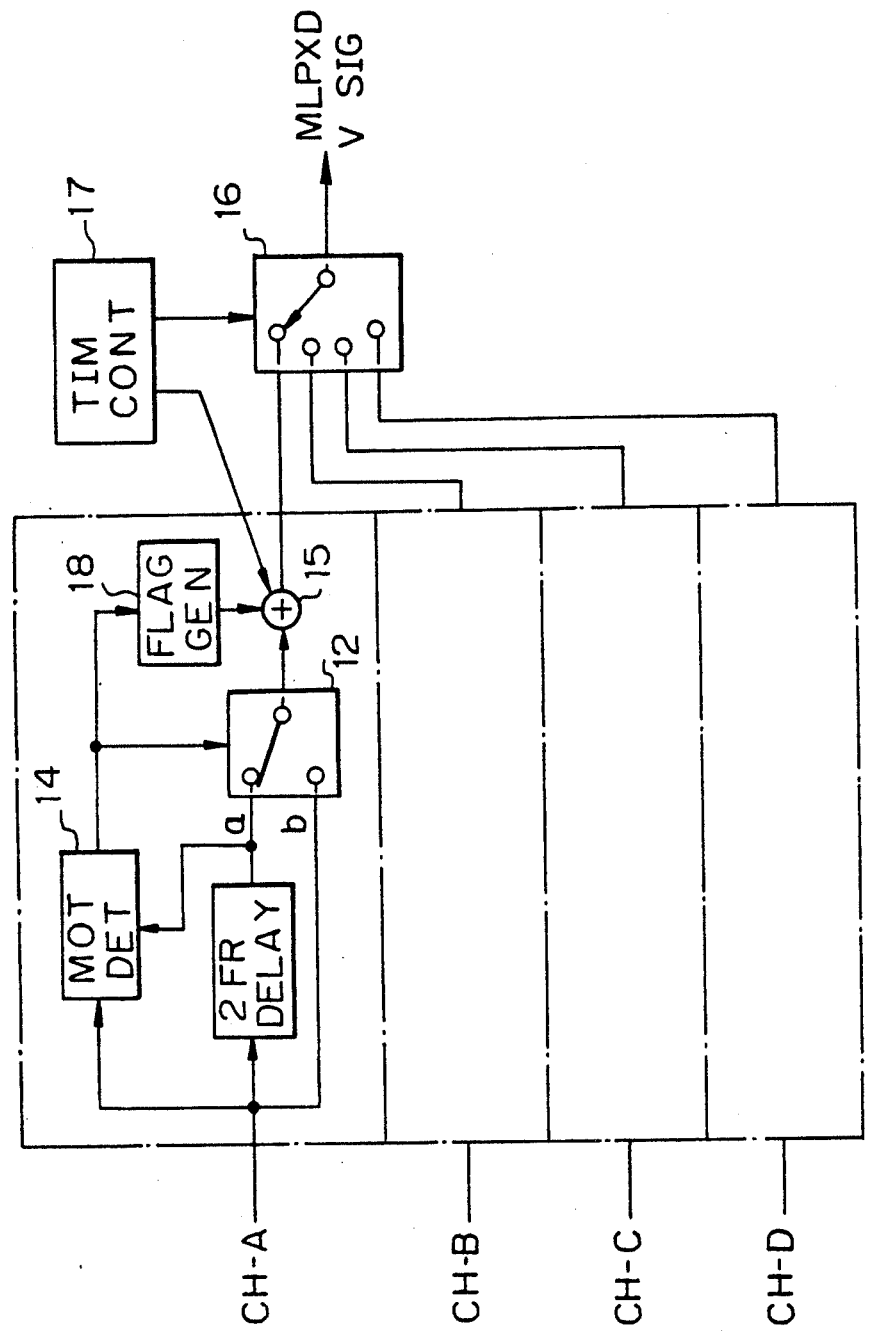
FIG. 10 is a block diagram of another embodiment of the editing apparatus for preparing a single time-division multiplexed signal on the basis of the original video signals of four channels.

FIG. 10 shows an embodiment of the editing apparatus for preparing the time-division multiplexed video signal (I) or (II) on the basis of the original video signals. In FIG. 10, although only a concrete construction of a circuit of the channel A is shown, the same circuit as that of the channel A is provided in each of the remaining channels B, C and D.

As shown in FIG. 10, the video signal of each channel enters a 2-frame delay circuit 11 so as to delay in time sequence by a period of two frames. The thus delayed video signal is then issued from the 2-frame delay circuit 11 to the switch 12 through its input terminal "a", while directly received by each of the motion detector circuit 14 and the switch 12 through its another input terminal "b". As shown in FIG. 11, in response to the output detection signal issued from the motion detector circuit 14, the switch 12 is so operated as to alternately connect the adder 15 with its input terminals "a"

and "b", i.e., with its input terminal "b" to select the current frame at a time when the picture contains substantially no motion, and with its input terminal "a" to combine one field of a frame previously positioned in time sequence by a period of two frames and one field of the current frame so as to prepare another frame to be selected at a time when the picture contains some motion. As a result, the time-division multiplexed video signal is a motion adaptive type in which: if the picture contains substantially no motion, the frame of the multiplexed video signal is composed of two fields adjacent in time sequence to each other and belonging to the same channel frame in the original video signal of each channel; and in case that the picture contains some motion, the frame of the multiplexed video signal is composed one of which is an even field belonging to one channel frame appearing at the time position assigned thereto and an odd field belonging to another channel frame having appeared before two field periods.

In the motion detector circuit 14, the picture difference in motion is detected between the frames. The motion detector circuit 14 is well know in the art, and, therefore its detailed description is neglected. The output signal issued from the motion detector circuit 14 constitute a control data for determining the reproducing mode of the two fields of each frame of the multiplexed video signal. Such control data then enters the adder 15 through a motion-flag generator circuit 18 so as to prepare a flag signal or code signal in the adder 15, to which flag signal or code signal is added to a leading portion of each frame, whereby the video signal of each channel is supplied to the video switcher 16 to prepare the single time-division multiplexed video signal (I) or (II) as shown in FIG. 9. Through the video switcher 16, the frames of the original video signal of each channel are spaced in time sequence apart from each other at intervals of a period of four frames. The timing control circuit 17 controls the operations of the adder 15 and the video switcher 16 in their timing.

The thus prepared time-division multiplexed video signal (I) or (II) is recorded on the recording medium from which the video signal of each channel, for example, channel A is reproduced. In such reproducing operation, when the picture contains substantially no motion, as shown in FIG. 12, a write enable (WE) signal with a low level is produced at the same intervals as that of the frame of channel A. Frame A of the multiplexed video signal is stored in the memory and is continuously issued from the memory, so as to compensate a frame-missing period of the original video signal of each channel during the reproducing operation. The reproduction operation does not cause the picture to deteriorate in vertical picture resolution.

On the other hand, the picture may contains some motion, and a signal occurs as shown in FIG. 13. The odd field of the two previously interlaced fields of the same frame of channel A separated in time sequence by a period of two frames. It is possible to decrease a length of a renewal cycle of the picture in the output signal issued from the memory to the extend of a half length of the renewal cycle of the picture in the output signal issued from the memory to the extent of a half length of the renewal cycle of the picture shown in FIG. 12(c) by repeating first the odd field four times and then repeating the even field four times. Now, the original video signal of channel A is stored at the same interval as the original video signal stored in the memory at a time when the picture contained substantially no motion. In addition, it is also possible to prevent the picture from vibrating in contrast with the disadvantageous vibrating motion in the picture reproduced through the use of the frame reproducing system employed in the conventional video signal transmission system. It is also possible to obtain a smooth motion in the picture containing a drastic motion.

In response to the flag signal or code signal which indicates the frame of field repetition which is added to the leading portion of each frame of the video signal in its recording operation, it is determined whether the reproducing operation of the video signal is repeatedly conducted in a frame unit or in a field unit. As described above, in the recording side of the video signal, it is determined whether the memory read-out mode is conducted through the use of the field repetition mode or the frame repetition mode. As a result, it is possible to simplify the construction of circuit of the reproducing apparatus of the video signal since it is not required to judge the motion of the picture in the recording side.

In the above embodiment of the present invention is employed an entire field processing system through which a field containing some motion part is treated as a motion field even if the field partially contains a stationary part. It is also possible to divide each field into a predetermined number of blocks so a repetition mode can be selectively applied to each block as seen from FIG. 14. If the picture contains the motion part and the stationary part in a mixing manner, it is preferable to divide each field into a predetermined number of blocks. When, for example, some characters are superimposed on a lower part of the picture, even when the background picture of the characters contains some motion, each block containing the characters is treated as a stationary part of the picture as a whole so that the block of the picture is composed of two fields belonging to the same frame, whereby the characters containing in the block is prevented from deteriorating in vertical picture resolution.

It is to be noted that a motion flag or command for indicating the read-out mode may be inserted into the leading portion of each frame of the time-division multiplexed video signal which is shown in FIG. 14.

Figure 15:
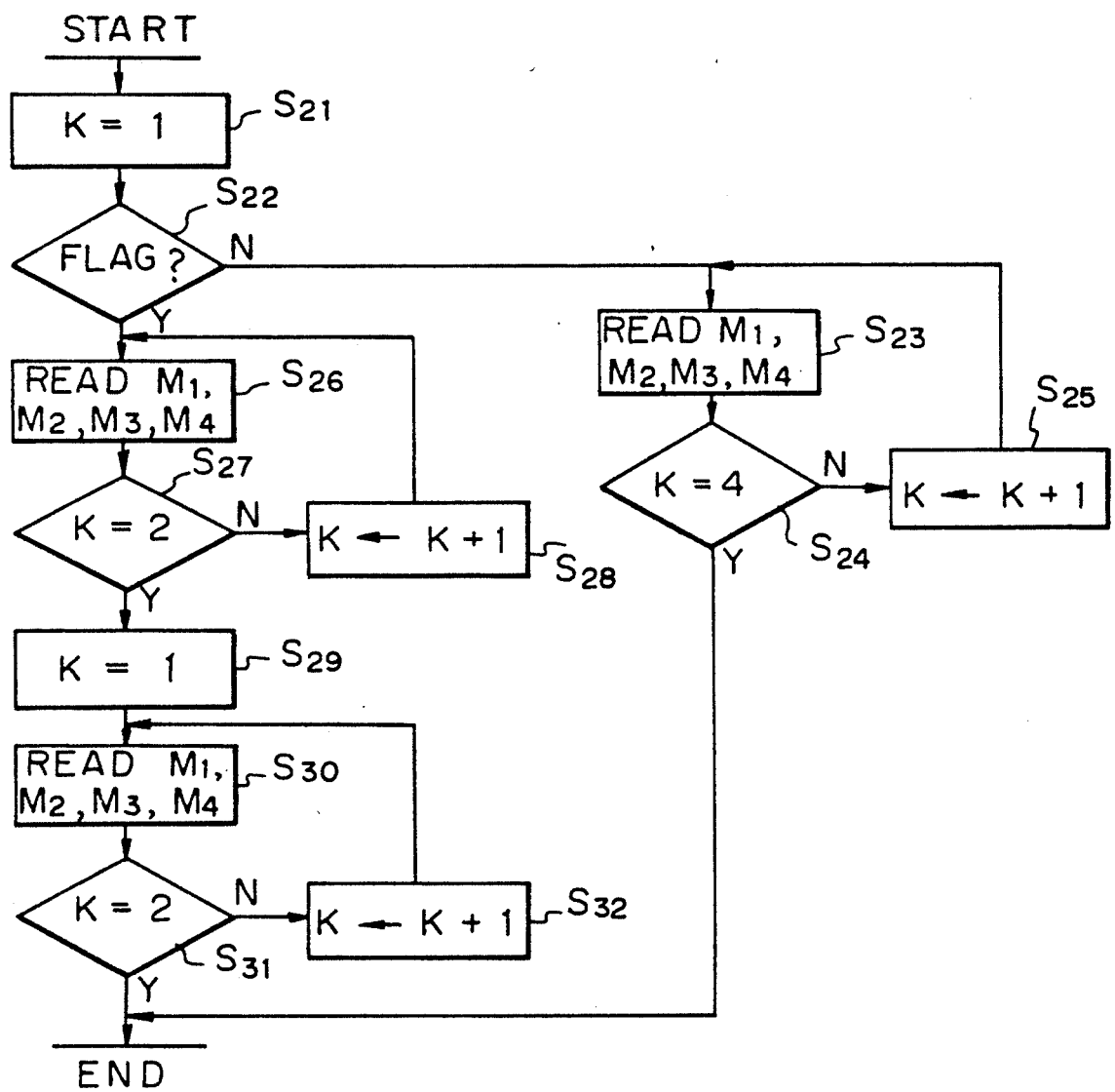
FIG. 15 is a flow chart showing a read out control mode in such reproducing apparatus as shown in FIG. 4B for reproducing the time-division multiplexed video signal shown in FIG. 14.

Such multiplexed video signal can be reproduced into the respective channel signals by using the reproduction apparatus of FIG. 4B in which the read-out control circuit 5A performs a read-out operation governed by a routine illustrated in FIG. 15. In the particular reproduction routine, a coefficient K is first set to "1" at step $S_{21}$. Thereafter, it is determined whether the flag detector 20 produces an output signal showing the existence of the motion flag, at a step $S_{22}$. When the output signal from the flag detector 20 indicates that no motion flag is detected, then the blocks $M_1$, $M_2$, $M_3$ and $M_4$ are read out in the sequence as mentioned until the coefficient K becomes "4", at steps $S_{23}$, $S_{24}$ and $S_{25}$. In this instance, it is to be understood that the blocks $M_1$ and $M_2$ respectively correspond to the upper and lower parts of a picture of an odd field and the blocks $M_3$ and $M_4$ respectively correspond to the upper and lower parts of a picture of an even field.

When it is determined that the flag detector 20 had detected the motion flag, then the blocks $M_1$, $M_2$, $M_3$ and $M_2$ are sequentially read out in the order mentioned by two times i.e. until the coefficient K becomes 2, at steps $S_{26}$, $S_{27}$ and $S_{28}$. Thereafter, the coefficient K is again set to "1", at a step $S_{29}$. Then the blocks $M_1$, $M_4$, $M_3$ and $M_4$ are sequentially read out in the order mentioned at two times, at steps $S_{30}$, $S_{31}$ and $S_{32}$.

In the above embodiments of the video signal transmission system according to the present invention, four channels are employed. However, it is clear that any number of channels can be employed in the video signal transmission system. For example, in case that two channels are employed therein, as in the embodiments of the present invention shown in FIGS. 4 and 10, it is only required that the 2-frame delay circuit 11 and the video switcher 16 are replaced with a one-frame delay circuit and a 2-channel selecting switch, respectively.

In addition, in the above embodiments of the video signal transmission system according to the present invention, the thus prepared time-division multiplexed video signal is recorded on a suitable recording medium such as video discs and video tapes, and reproduced therefrom. However, it is also possible to apply the present invention to a CATV and a television broadcast for a number of channels.

As described in the above, in the video signal transmission system according to the present invention, the two interlaced fields of the same frame of the time-division multiplexed video signal are composed of two fields of the original video signal of each channel which fields are spaced in time sequence apart from each other at intervals of a predetermined number of fields of the original video signal of each channel. Consequently, in the video signal transmission system of the present invention: when the picture contains substantially no motion, there is no fear that the vertical picture resolution of the picture is deteriorated; and when the picture contains some motion, it is possible to reproduce the picture with a smooth motion.

In another embodiment of the video signal transmission system of the present invention: when the picture contains substantially no motion in each of a predetermined number of blocks constructing the picture, the two interlaced fields of the same frame of the time-division multiplexed video signal in each block are composed of two fields of the original video signal of each channel which fields belong to the same frame in the original video signal of each channel; and when the picture contains some motion in each block of the picture, two interlaced fields of the same frame of the time-division multiplexed video signal in each block are composed of two fields of the original video signal of each channel which fields are spaced in time sequence apart from each other at intervals of a predetermined number of fields of the original video signal of each channel. Namely, in case that the picture contains substantially no motion, the picture is reproduced by repeating in a frame unit to prevent the vertical picture resolution from deteriorating, while the picture is reproduced by repeating in a field unit when the picture contains some motion thereby to prevent the picture from vibrating while realizing smooth motion of the picture.

In other words, in the video signal reproduction system of the present invention for a plurality of channels, in response to the picture motion, the field repetition reproducing operation of the picture and the frame repetition reproducing operation of the picture are selectively conducted, to make it possible to prevent the vertical picture resolution of the picture from deteriorating and to realize a smooth motion of the picture.

What is claimed is:

1. A transmitter for transmitting a multi-channel video transmission signal formed from a plurality of video signals concurrently appearing and corresponding respectively to a set number of channels, said transmitter comprising:
   input means for providing said plurality of video signals;
   means, responsive to said input means, for forming new channel frames respectively at time positions corresponding to respective ones of said channels, wherein each said new channel frame is formed by combining an odd field and an even field respectively belonging to different original channel frames of a given one of said video signals, said original frames being apart from each other by a number of frames smaller than said set number of said channels; and
   means for transmitting said new channel frames in sequence as said transmission signal.

2. The transmitter as defined by claim 1, further comprising:
   means for inserting a flag signal in each of said new channel frames, said flag signal indicating a reproduction manner for each of said new channel frames.

3. The transmitter as defined by claim 2, in which said flag signal represents an amount of motion of a picture represented by one of said original channel frames at a time position corresponding to a new channel frame.

4. A transmitter for transmitting a multi-channel video transmission signal formed from a plurality of video signals from a set number of channels to be multiplexed, which comprises:
   means for extracting channel frames of said video signals and storing said extracted channel frames in memory means;
   means for dividing each said extracted channel frame into at least first and second block portions;
   means for forming new channel frames by sequentially inserting into a first block portion originally belonging to one frame a second block portion originally belonging to another frame of the same video signal as said one frame, said one and another frames being apart from each other by a number of frames smaller than said set number of said channels to be multiplexed; and
   means for transmitting said new channel frames in sequence, while adding a flag signal to respective new channel frames, said flag signal indicating a reproduction manner with respect to said new channel frames.

5. The transmitter as defined by claim 4, in which said flag signal represents an amount of motion of a picture represented by an original channel frame appearing at a time position of a new channel frame.

6. The transmitter as defined by claim 4, in which block portions belonging to a field of one channel frame respectively correspond to former half and latter half portions of said field.

7. A multi-channel video signal reproduction system for reproducing a time-division multiplexed video signal comprising successive frames each if which are associated with a respective one of different video signals, which comprises:
   means for extracting respective channel frames from said time-division multiplexed video signal;
   means for storing said extracted channel frames in memory means;

selecting means for selecting one mode of frame-repetition and field-repetition modes; and read-out means for reading out from said memory means block portions or fields of said stored channel frames in accordance with said selected one mode of said modes.

8. A multi-channel video signal reproduction system according to claim 7, in which said selecting means selects said one mode of said frame-repetition and field-repetition modes in accordance with a flag signal contained in said time-division multiplexed video signal.

9. A multi-channel video signal reproduction system according to claim 7, in which said selecting means selects said one mode of said frame-repetition and field-repetition modes in accordance with an amount of motion of a picture represented by a corresponding channel frame.

* * * * *